(12) United States Patent
Shirai

(10) Patent No.: US 9,286,478 B2
(45) Date of Patent: Mar. 15, 2016

(54) IMAGE PROCESSING DEVICE AND COMPUTER READABLE STORAGE MEDIUM THEREFOR

(75) Inventor: Takaaki Shirai, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 572 days.

(21) Appl. No.: 12/695,592

(22) Filed: Jan. 28, 2010

(65) Prior Publication Data

US 2010/0188683 A1    Jul. 29, 2010

(30) Foreign Application Priority Data

Jan. 29, 2009 (JP) ................................. 2009-018218

(51) Int. Cl.
| | |
|---|---|
| G06F 3/12 | (2006.01) |
| G06F 15/00 | (2006.01) |
| G06K 15/10 | (2006.01) |
| G06T 5/00 | (2006.01) |
| G06F 21/60 | (2013.01) |

(52) U.S. Cl.
CPC ..................................... G06F 21/608 (2013.01)

(58) Field of Classification Search
CPC ................... G03G 21/046; G03G 2215/00932
USPC ........... 358/474, 1.14; 348/333.13, 143, 135, 348/14.07; 382/162; 713/176
See application file for complete search history.

(56) References Cited

U.S. PATENT DOCUMENTS

| | | | | |
|---|---|---|---|---|
| 4,211,483 A | * | 7/1980 | Hannigan et al. ................ | 399/85 |
| 5,235,681 A | * | 8/1993 | Masuzaki ........... | G06F 21/6227 |
| | | | | 345/556 |
| 6,424,429 B1 | | 7/2002 | Takahashi et al. | |
| 7,246,239 B2 | * | 7/2007 | Rodriguez et al. ............ | 713/176 |
| 7,653,947 B2 | * | 1/2010 | Hatano ................ | G03G 15/502 |
| | | | | 380/203 |
| 7,979,019 B2 | * | 7/2011 | Yoshino ............... | G03G 21/046 |
| | | | | 283/902 |
| 2002/0023071 A1 | | 2/2002 | Takahashi | |
| 2002/0062206 A1 | * | 5/2002 | Liebchen .......................... | 703/6 |

(Continued)

FOREIGN PATENT DOCUMENTS

| | | |
|---|---|---|
| JP | SHO 55-115157 | 9/1980 |
| JP | HEI 07-203192 | 8/1995 |

(Continued)

OTHER PUBLICATIONS

Japanese Official Action dated Dec. 21, 2010 together with English language translation.

(Continued)

*Primary Examiner* — Akwasi M Sarpong
(74) *Attorney, Agent, or Firm* — Scully, Scott, Murphy & Presser, PC

(57) ABSTRACT

An image processing device is provided. The image processing device includes a scanner to scan an image formed in a scannable area which is allocated on a sheet, an image obtainer to obtain a processible image formed in the scannable area and scanned by the scanner, a judging unit to judge as to whether the processible image obtained by the image obtainer includes an identifying image, which qualifies a predetermined authentication criterion, and a function controller to activate a predetermined function of the image processing device, which processes the processible image obtained by the image obtainer, when the judging unit judges that the obtained processible image includes the identifying image therein.

10 Claims, 9 Drawing Sheets

(56) References Cited

U.S. PATENT DOCUMENTS

| | | | |
|---|---|---|---|
| 2002/0157005 A1* | 10/2002 | Brunk et al. | 713/176 |
| 2003/0167196 A1* | 9/2003 | Khizer | G06Q 30/0203 705/7.32 |
| 2003/0179412 A1 | 9/2003 | Matsunoshita | |
| 2003/0210803 A1* | 11/2003 | Kaneda | G06T 1/0028 382/100 |
| 2004/0042830 A1 | 3/2004 | Kaburagi et al. | |
| 2004/0165769 A1* | 8/2004 | Huh | H04N 5/57 382/162 |
| 2005/0036651 A1* | 2/2005 | Wen | G06T 1/0028 382/100 |
| 2005/0038756 A1 | 2/2005 | Nagel | |
| 2005/0094183 A1 | 5/2005 | Kojima | |
| 2005/0111867 A1* | 5/2005 | Hatano | 399/80 |
| 2005/0141009 A1 | 6/2005 | Kiwada | |
| 2005/0172151 A1 | 8/2005 | Kodimer et al. | |
| 2005/0174601 A1 | 8/2005 | Sawada | |
| 2005/0207767 A1 | 9/2005 | Imayoshi et al. | |
| 2006/0007471 A1* | 1/2006 | Okamoto | H04N 1/32133 358/1.14 |
| 2006/0026434 A1* | 2/2006 | Yoshida | G06F 21/608 713/182 |
| 2006/0136087 A1 | 6/2006 | Higashiura | |
| 2006/0197972 A1 | 9/2006 | Hayashi | |
| 2006/0290967 A1 | 12/2006 | Sumitomo et al. | |
| 2007/0005611 A1* | 1/2007 | Takasugi et al. | 707/100 |
| 2007/0008569 A1 | 1/2007 | Shimazawa | |
| 2007/0121174 A1* | 5/2007 | Higashiura | H04N 1/00363 358/464 |
| 2007/0177823 A1 | 8/2007 | Tredoux | |
| 2007/0182982 A1* | 8/2007 | Hayashida | H04N 1/0035 358/1.14 |
| 2007/0223955 A1* | 9/2007 | Kawabuchi | G03G 21/04 399/80 |
| 2007/0245153 A1 | 10/2007 | Richtsmeier et al. | |
| 2008/0025606 A1 | 1/2008 | Hanano | |
| 2008/0092231 A1 | 4/2008 | Awata | |
| 2008/0093468 A1 | 4/2008 | Fan et al. | |
| 2008/0130942 A1 | 6/2008 | Kitani | |
| 2008/0130963 A1 | 6/2008 | Sakaue | |
| 2008/0144071 A1 | 6/2008 | Uchikawa | |
| 2008/0320604 A1 | 12/2008 | Nakajima et al. | |
| 2009/0016615 A1 | 1/2009 | Hull et al. | |
| 2009/0034002 A1* | 2/2009 | Shibaki | H04N 1/6072 358/2.1 |
| 2009/0049541 A1 | 2/2009 | Ban | |
| 2009/0059287 A1 | 3/2009 | Yamada | |
| 2009/0119755 A1 | 5/2009 | Kodimer et al. | |
| 2009/0161993 A1 | 6/2009 | Matsunoshita | |
| 2009/0201543 A1 | 8/2009 | Tonami et al. | |
| 2009/0228710 A1 | 9/2009 | Bergh et al. | |
| 2009/0257076 A1 | 10/2009 | Qi et al. | |
| 2010/0089992 A1 | 4/2010 | Kitada et al. | |
| 2010/0091313 A1 | 4/2010 | Kitada et al. | |
| 2010/0188683 A1 | 7/2010 | Shirai | |

FOREIGN PATENT DOCUMENTS

| | | |
|---|---|---|
| JP | HEI 09-307751 | 11/1997 |
| JP | 2002-049281 | 2/2002 |
| JP | 2005-65053 | 3/2005 |
| JP | 2006-25255 | 1/2006 |
| JP | 2006-335051 | 12/2006 |
| JP | 2007-166229 | 6/2007 |

OTHER PUBLICATIONS

U.S. Office Action dated Dec. 19, 2012, received in related U.S. Appl. No. 12/694,716.

Notification of Reasons for Rejection dated Aug. 16, 2011 received from the Japanese Patent Office from related Japanese Application No. 2009-018215 and U.S. Appl. No. 12/694,716, together with an English-language translation.

Official Action (Notice of Allowance) dated Jun. 24, 2013 in related U.S. Appl. No. 12/694,716.

United States Official Action dated Dec. 20, 2013 received in a related U.S. Appl. No. 14/039,991.

U.S. Office Action dated Aug. 7, 2014 received in related U.S. Appl. No. 14/039,991.

United States Notice of Allowance dated Nov. 21, 2014 received in a related U.S. Appl. No. 14/039,991.

* cited by examiner

| USER NAME | FIRST AUTHENTICATION DATA | FAX TRANSMISSION | i-FAX TRANSMISSION | COPY | SCAN TO USB |
|---|---|---|---|---|---|
| User1 | 1111 | PERMITTED (up to n transmissions) | PERMITTED (up to m transmissions) | PERMITTED (up to n copies) | × |
| User2 | 2222 | PERMITTED (up to n transmissions) | PERMITTED (up to m transmissions) | PERMITTED (up to n copies) | × |
| User3 | 3333 | × | × | PERMITTED (up to n copies) | × |
| ⋮ | ⋮ | ⋮ | ⋮ | ⋮ | ⋮ |
| Public | (None) | | | | |

FIG.2A

| USER NAME | SECOND AUTHENTICATION DATA |
|---|---|
| User1 | IDENTIFYING IMAGE DATA #1 |
| User2 | IDENTIFYING IMAGE DATA #2 |
| User3 | IDENTIFYING IMAGE DATA #3 |
| ⋮ | ⋮ |
| Public | (None) |

FIG.2B

IMAGE PROCESSING DEVICE AND COMPUTER READABLE STORAGE MEDIUM THEREFOR

CROSS REFERENCE TO RELATED APPLICATION

This application claims priority from Japanese Patent Application No. 2009-018218, filed on Jan. 29, 2009, the entire subject matter of which is incorporated herein by reference.

BACKGROUND

1. Technical Field

An aspect of the present invention relates to an image processing device capable of permitting and restricting usage of functions provided to the image processing device on basis of a user and a computer readable storage medium therefor.

2. Related Art

Conventionally, an image processing device having a plurality of functions has been known. The plurality of functions may be, for example, a printing function, a scanning function, a copier function, a facsimile receiving/transmission function, and a data transferring function. The image processing device may have an authentication function to authenticate users so that usage of the functions of the image processing device is allowed only to approved users.

Such an image processing device with the authentication function is generally configured to receive identifying information to identify the user, such as a user name and a password, and permit usage of specific functions when the identifying information is confirmed.

SUMMARY

When the image processing device requiring authentication, however, the user is required to manually input the identifying information through an input device (e.g., operation panel with keys). The inputting operation may be redundant and troublesome specifically when the input device is provided with a small number of keys. Manipulating the small number of keys to enter the identifying information may be troublesome and may occasionally provoke input errors.

In view of the above drawback, the present invention is advantageous in that an image processing device, capable of authenticating specific users without requiring the users to manually input the identifying information, is provided. Further, a computer readable storage medium for the image processing device is provided.

According to an aspect of the present invention, an image processing device is provided. The image processing device includes a scanner to scan an image formed in a scannable area which is allocated on a sheet, an image obtainer to obtain a processible image formed in the scannable area and scanned by the scanner, a judging unit to judge as to whether the processible image obtained by the image obtainer includes an identifying image, which qualifies a predetermined authentication criterion, and a function controller to activate a predetermined function of the image processing device, which processes the processible image obtained by the image obtainer, when the judging unit judges that the obtained processible image includes the identifying image therein.

According to another aspect of the present invention, a computer readable medium storing computer readable instructions is provided. The computer readable instructions cause a computer to process an image by executing steps of obtaining a processible image formed in a scannable area and scanned by a scanner of the computer, the scannable area being allocated on a sheet; judging as to whether the obtained processible image includes an identifying image, which qualifies a predetermined authentication criterion, and activating a predetermined function of the computer, which processes the obtained processible image, when the obtained processible image is judged to include the identifying image therein.

BRIEF DESCRIPTION OF THE ACCOMPANYING DRAWINGS

FIG. 2A illustrates information to be stored in a functional limitation storage area of a storage unit in the MFP according to the embodiment of the present invention. FIG. 2B illustrates information to be stored in an identifying image data storage area of a storage unit in the MFP according to the embodiment of the present invention.

DETAILED DESCRIPTION

Figure 1A:
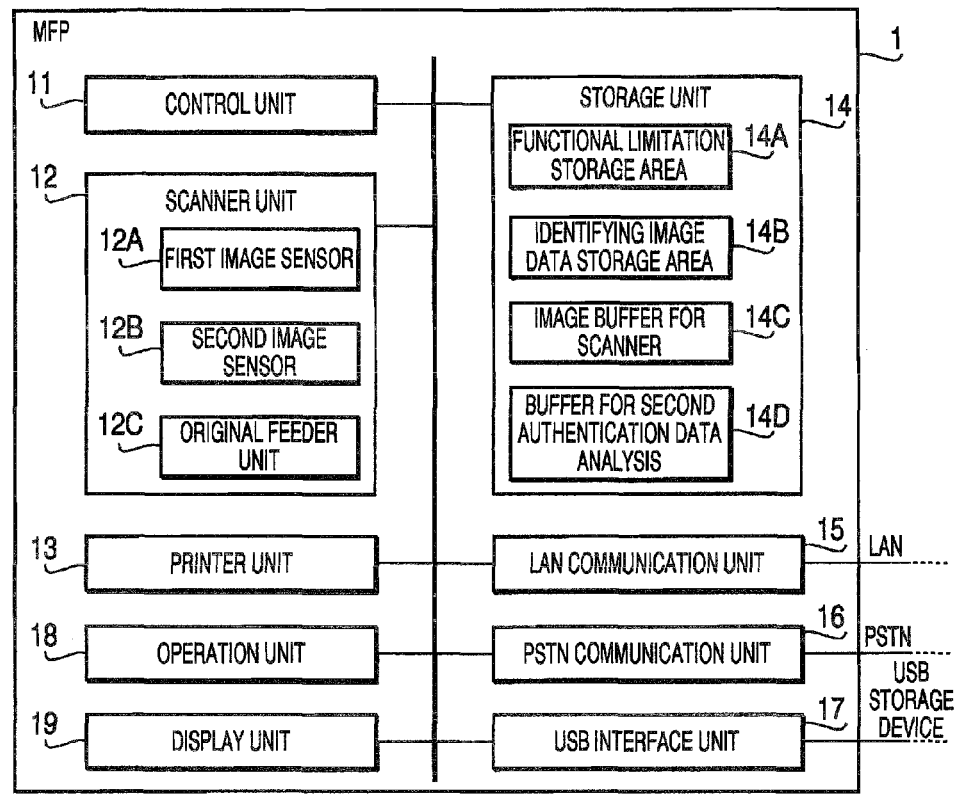
FIG. 1A is a block diagram to illustrate an electrical configuration of a multifunction peripheral device (MFP) according to an embodiment of the present invention.

Hereinafter, an embodiment according to the present invention will be described with reference to the accompanying drawings. Firstly, an overall configuration of an MFP 1 according to the present embodiment will be described with reference to FIG. 1A.

The MFP 1 is a multifunction device having a plurality of implements such as a printing function, a scanning function, a copier function, a facsimile communication function, and i-FAX (internet facsimile) communication function. The MFP 1 further has a function to transmit data representing a scanned image to a USB-enabled storage device (so-called Scan-to-USB function). In order to implement these functions, the MFP 1 is provided with a control unit 11, a scanner unit 12, a printer unit 13, a storage unit 14, a LAN communication unit 15, a PSTN (public switched telephone networks) communication unit 16, a USB interface unit 17, an operation unit 18, and a display unit 19.

The control unit 11 includes a microcomputer (not shown) with a CPU, a ROM, and a RAM. The control unit 11 control entire behaviors of the MFP 1.

The scanner unit 12 includes a first image sensor 12A, a second image sensor 12B, and an original feeder unit 12C. The first image sensor 12A and the second image sensor 12B are devices to optically read an image formed on an original sheet. The original feeder unit 12C is a device to feed a plurality of original sheets of to the first and second image sensors 12A, 12B separately one by one.

A configuration of the scanner unit 12 will be described with reference to FIG. 1B. The first image sensor 12A is arranged along a feeding path of the original sheet in a position, in which the first image sensor 12A can read an obverse side D1 of the original sheet being fed by the original feeder unit 12C. The second image sensor 12B is arranged along the feeding path in a position, in which the second image sensor 12B can read a reverse side D2 of the original sheet being fed by the original feeder unit 12C. Accordingly, the images formed on the obverse side and the reverse side of the original sheet can be read respectively by the first image sensor 12A and the second image sensor 12B concurrently.

Figure 1B:
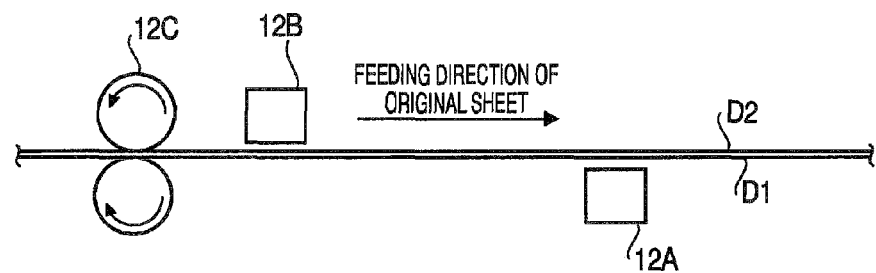
FIG. 1B illustrates a schematic view of a scanner unit in the MFP according to the embodiment of the present invention.

As illustrated in FIG. 1A, the first image sensor 12A and the second image sensor 12B are located in positions to be apart from each other for a predetermined length along the feeding path; therefore, the second image sensor 12B starts reading the reverse side D2 prior to the first image sensor 12A reading the obverse side D1. The first image sensor 12A starts reading the obverse side D1 when the original sheet reaches a position opposing the first image sensor 12A along the feeding path.

The printer unit 13 is a printing device to form an image on a recording sheet. The image to be formed on the recording sheet may be obtained through the scanner unit 12 reading the original image or through the facsimile receiving function of the MFP 1.

The storage unit 14 includes a non-volatile memory area provided by, for example, a hard disk drive and an NVRAM and a temporary memory area provided by, for example, a RAM. The non-volatile memory area in the storage unit 14 has a functional limitation storage area 14A and an identifying image data storage area 14B. Information stored in the non-volatile memory area is maintained even after the MFP 1 is powered off. The temporary memory area has an image buffer 14C for scanner and a buffer area 14D for second authentication data analysis. When the scanner unit 12 reads an image, data representing the image is stored in the image buffer 14C, and the buffer area 14D for second authentication data analysis is used a work area for analyzing the obtained image data.

The LAN communication unit 15 includes a communication interface to connect the MFP 1 to a local area network (LAN) so that the MFP 1 can exchange data with other external devices (not shown) through the LAN. When the LAN, to which the MFP 1 is connected, is further connected to a wide area network (WAN) such as the Internet through a gateway, the MFP 1 can communicate with other external devices outside the LAN through the WAN. The data exchange through the LAN communication unit 15 can be performed by the i-FAX function of the MFP 1.

The PSTN communication unit 16 includes devices such as a facsimile modem and audio CODEC, which are required to connect the MFP 1 to the PSTN. The MFP 1 can communicate with other PSTN-enabled external devices (e.g., a facsimile machine; not shown) through the PSTN. The data exchange through the PSTN can be performed by the PSTN communication unit 16.

The USB interface unit 17 includes an interface to connect the MFP 1 to a USB-enabled storage device. When, for example, the MFP 1 utilizes the Scan-to-USB function, the data representing the image scanned by the scanner unit 12 can be transferred to the USB-enabled storage device through the USB interface unit 17.

Next, authenticating function to authenticate users of the MFP 1 will be described. In the present embodiment, specific functions among the plurality of functions provided to the MFP 1 are available to approved users when a function-locking function is activated in the MFP 1. The users can be approved in two methods, which are a first authentication method and a second authentication method in the present embodiment.

In the first authentication method, a user is required to manipulate the operation unit 18 to select a user name and enter first authentication data (i.e., a password) corresponding to the user name. In the second authentication method, an identifying image formed on a surface of a sheet is read by the scanner unit 12.

Firstly, the first authentication method will be described with reference to FIG. 2A. In order to accomplish the first authentication method, a plurality of sets of data are stored in the functional limitation storage area 14A in the storage unit 14. Each data set includes six entries, which are "User name," "First authentication data," "Fax transmission," "i-Fax transmission," "Copy," and "Scan-to-USB," and each data set corresponds to a specific user. The information in the fields "Fax transmission," "i-Fax transmission," "Copy," and "Scan-to-USB" respectively indicates permission for the user to use the facsimile transmission function, the i-FAX transmission function, and the Scan-to-USB function. The fields further include information which indicates, when the user is permitted to use the function, a permitted number of times to use the function. Thus, the information stored in the functional limitation storage area 14A indicates usability of the functions installed in the MFP 1 on basis of the user.

The fields "User name" and "First authentication data" include character strings to which the MFP 1 refers when the MFP 1 checks authenticity of the user in the first authentication method. In the present embodiment, the character strings are provided to the user by an administrator of the MFP 1.

The user name and the first authentication data are registered in the functional limitation storage area 14A by the administrator in advance, and the user is informed thereof by the administrator later. When the user attempts to use one of the functions in the MFP 1, which requires authentication of the user in the first authentication method, the user manipulates the operation unit 18 to select the given user name and enter the given first authentication data.

When the user name and the first authentication data are entered, the MFP 1 refers to the information registered in the functional limitation storage area 14A and compares the entered user name and the entered first authentication data with the registered user name and the registered first authentication data. When the entered information and the registered information match, the MFP 1 authenticates the user, and the user is allowed to login with the user name.

When the user is authenticated, the MFP 1 refers to the information in one of the entries "Fax transmission," "i-Fax transmission," "Copy," and "Scan-to-USB", which corresponds to the function desired by the user, in the data set. Thus, the MFP 1 judges as to whether the current user is permitted to use the desired function. Further, if the user is permitted to use the function, the MFP 1 further judges as to whether the current usage by the current user is within the limited number assigned by the administrator.

The information indicated in the entries "Fax transmission," "i-Fax transmission," "Copy," and "Scan-to-USB" has been, similarly to the user name and the first authentication data, registered in the functional limitation storage area 14A by the administrator in advance.

An example of authentication of a user will be described. When, for example, information as shown in FIG. 2A is registered in the functional limitation storage area 14A, and a user manipulates the operation unit 18 to select a user name "User1" and enter first authentication data "1111," the MFP 1 authenticates the user.

Once the user is authenticated, the MFP 1 refers to the data set in the functional limitation storage area 14A corresponding to the user and permits one of facsimile transmission, i-FAX transmission, and copying within the limiting number assigned by the administrator and indicated in the fields. When the user desires to use the Scan-to-USB function, however, the MFP 1 prohibits the user from using the function. When the user wishes to use the function, but the user has experienced to use the function for the limited number of times, the user is no longer permitted to use the function.

When a different user attempts to use the MFP 1, authenticity of the different user is similarly examined, and the MFP 1 provides the desired function based on the permission and restriction indicated in the functional limitation storage area 14A. For example, when a user with a user name "User3" is authenticated, the user is permitted to use the copier function up to the number indicated in the "Copier" field corresponding to the user. Meanwhile, usage of the facsimile transmission function, i-FAX transmission function, and the Scan-to-USB function is prohibited.

When a user fails in the authentication, or when a predetermined time period elapses after successful authentication, the MFP 1 operates in a "public" mode, in which usage of the functions is permitted or restricted in accordance with information in a data set for "Public" users as registered in the functional limitation storage area 14A (see a lowermost row in FIG. 2A).

Therefore, the functions of the MFP 1, of which usage is permitted to public by the administrator, can be used even when the user is not authenticated. The usable functions open to public in the public mode are determined by discretion of the administrator. In general, however, the usability of the functions open to public may be restricted to be narrower compared to the usability of the functions based on authentication.

Next, the second authentication method will be described with reference to FIG. 2B. In order to accomplish the second authentication method, a plurality of sets of data are stored in the identifying image data storage area 14B in the storage unit 14. Each data set includes two entries, which are "User name" and "second authentication data." Each data set is registered in correspondence with a user.

The users (i.e., the character strings in the "User name" field) registered in the identifying image data storage area 14B are identical to the users registered in the functional limitation storage area 14A. Thus, the data sets registered in the functional limitation storage area 14A and the identifying image data storage area 14B are associated with each other on the basis of the user names.

The second authentication data in the present embodiment is data representing a personal identifying image to be used for authentication. Alternatively, the second authentication data may be criterial data for the MFP 1 to judge authenticity of a personal identifying image. The criterial data may be, for example, when the personal identifying image is a bar-code image, binary data represented by the bar-code image. For another example, the criteria data may be, when the personal identifying image is an image representing a character string, text data which can be extracted from the image through an OCR operation. In the present embodiment, the second authentication data is a piece of data representing an image of an imprinted personal seal.

According to the present embodiment, when the image data representing an imprinted personal seal is used as the second authentication data, an image of an imprinted personal seal provided by the user is scanned by the scanner unit 12 to generate the image data representing the imprinted seal. The image data is thus registered in the identifying image data storage area 14B by the administrator. After the registration, the user can be authenticated in the second authorization method.

When the MFP 1 authenticates the user according to the second authentication method, the user manipulates the operation unit 18 to activate a function (e.g., facsimile transmission, copier, etc.) involving the scanning behavior of the scanner unit 12.

Figure 3:
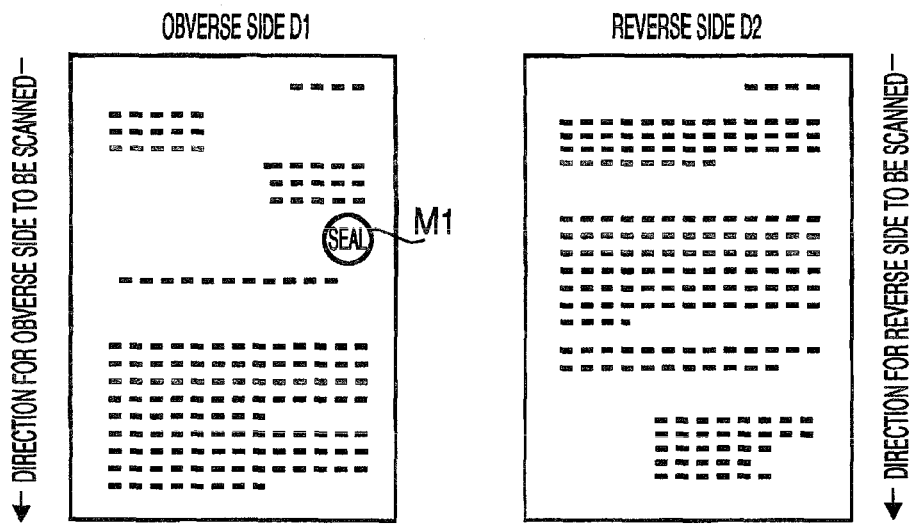
FIG. 3 illustrates an obverse side and a reverse side of an original sheet to be fed in the MFP according to the embodiment of the present invention.
Figure 4:
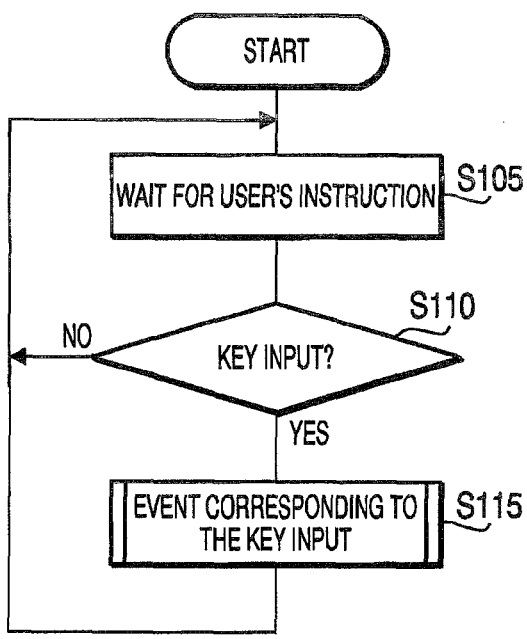
FIG. 4 is a flowchart to illustrate a main operation flow in the MFP according to the embodiment of the present invention.

When the function is activated, the MFP 1 controls the scanner unit 12 to read an image formed in a scannable area on a surface of an original sheet and extracts an identifying image from the read image. When, for example, an original sheet having an obverse side D1 and a reverse side D2 as shown in FIG. 3 is scanned, processible images formed on the obverse side D1 and the reverse side D2 are read. In this example, the processible image formed on the obverse side D1 includes an image of an imprinted personal seal M1 being the identifying image. Meanwhile, the reverse side D2 does not include any imprinted personal seal or the identifying image. The processible images other than the imprinted personal seal M1 in the obverse side D1 and the reverse side D2 of the original sheet, represented by dots, may be, for example, character strings and figures.

In the present embodiment, the MFP 1 analyzes the processible image formed on the obverse side D1 to extract the identifying image based on an assumption that the identifying image is included in the processible image formed on the obverse side D1. In the present example, the imprinted personal seal M1 being the identifying image is included in the processible image formed on the obverse side D1 of the original sheet. However, the identifying image may be formed on the reverse side D2 of the original sheet, and the MFP 1 may analyze the processible image formed on the reverse side D2 based on an assumption that the identifying image is formed on the reverse side D2.

Moreover, the MFP 1 may be configured to have the administrator designate a side of the original sheet, on which the identifying image is assumed to be included in the processible image. Further, the side of the original sheet on which the identifying image is assumed to be included in the processible image is not necessarily designated, but the MFP 1 may scan the both sides of the original sheet and extract the identifying image when the identifying image is detected on whichever side of the original sheet.

In any configuration, regardless of the assumption, when the identifying image is extracted, the image is compared with the image data represented by the second authentication data, which is registered in the image authentication data storage 14B. Alternatively, binary data or image data representing the scanned image is compared with the second authentication data. When the image data obtained by the scanner unit 12 and the second authentication data match, the user who has the original sheet with the image formed in the predetermined identifying image area is authenticated.

When the user is authenticated, the MFP 1 refers to the information in one of the entries "Fax transmission," "i-Fax transmission," "Copy," and "Scan-to-USB", which corresponds to the function desired by the user, in the data set registered in the functional limitation storage area 14A. Thus, the MFP 1 judges as to whether the current user is permitted to use the desired function. Further, if the user is permitted to use the function, the MFP 1 further judges up to how many times the user is permitted to use the function.

When the user fails to be authenticated, or when the user is prohibited from using the desired function, the MFP 1 manipulates the scanner unit 12 solely to read the identifying image but prohibits the user from using the desired function.

In the present embodiment, the administrator can preset the authentication method to be used in the MFP 1. The MFP 1 may authenticate the user solely in the first authentication method or in the second authentication method according to the administrator's discretion. Alternatively, the MFP 1 may authenticate the user in the first authentication method together with the second authentication method.

Next, flows of operations to utilize the above authentication methods in the MFP 1 will be described with reference to FIGS. 4 through 8.

A main operation flow of the MFP 1 is activated when the MFP 1 is powered on and conducted by the CPU in the control unit 11. When the flow starts, in S105, the MFP 1 waits for a user's input through a key. In S110, the MFP 1 judges as to whether the user's input is given. When no input is detected (S110: NO), the MFP 1 returns to S105. Thus, the MFP 1 repeats S105-S110 until the user's input is detected.

When the user's input through a key is detected (S110: YES), in S115, the MFP 1 recognizes an event corresponding to the manipulated key and behaves accordingly to the event. After completion of the event, the MFP 1 returns to S105.

In S115, the behavior of the MFP 1 to be performed varies depending on the key manipulated by the user. In the MFP 1 according to the present embodiment, the behavior can be one of user registration, function-locking, and function-controlling. These behaviors of the MFP 1 will be described hereinbelow.

Figure 5:
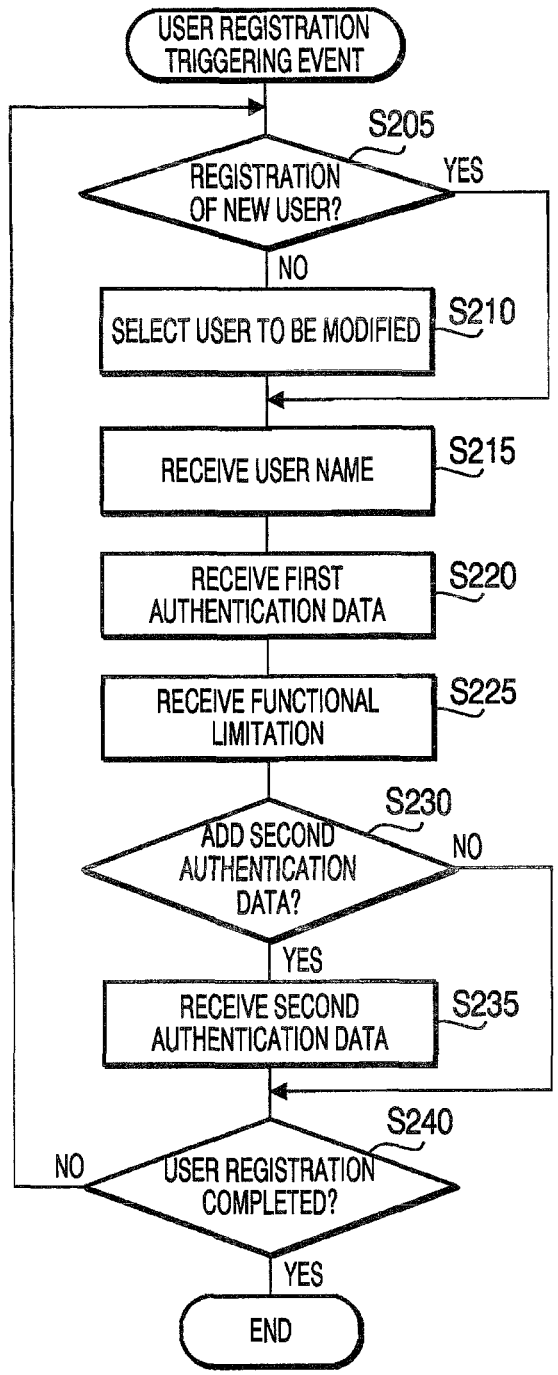
FIG. 5 is a flowchart to illustrate a flow of user registration executed in the MFP according to the embodiment of the present invention.

The flow of user registration will be described with reference to FIG. 5. The flow of user registration is activated upon a triggering event, which is manipulation of the corresponding key by the administrator of the MFP 1.

When the flow starts, in S205, the MFP 1 judges as to whether the registration is for registering a new user. In the MFP 1 according to the present embodiment, registration of a user includes registering a new user and modifying information concerning an existing user who is already registered. Therefore, the administrator informs the MFP 1 of as to whether the current registration is registering a new user by manipulating a predetermined key in the operation unit 18. In S205, therefore, the MFP 1 judges based on the manipulated key as to whether the current registration is for registering a new user.

In S205, when the MFP 1 determines that the current registration is not for registering a new user (S205: NO), in S210, the MFP 1 prompts the administrator to select an existing user, of which information is to be modified, and receives the administrator's selection. The flow proceeds to S215. In S205, when the MFP 1 determines that the current registration is for registering a new user (S205: YES), the MFP 1 skips S210 and proceeds to S215.

In S215, the MFP 1 receives information concerning the user to be registered or modified. When the current registration is for registering a new user, the administrator enters a new user name. When the current registration is for modifying an existing user, if necessary, the administrator modifies at least a part of the existing user name. The entered or modified user name is stored in the functional limitation storage area 14A.

In S220, the MFP 1 receives information concerning the first authentication data. When the current registration is for registering a new user, the administrator enters first authentication data corresponding to the new user. When the current registration is for modifying an existing user, if necessary, the administrator modifies the first authentication data corresponding to the existing user. The entered or modified first authentication data is stored in the functional limitation storage area 14A. The flow proceeds to S225.

In S225, the MFP 1 receives limitation concerning usage of the functions of the MFP 1, which are facsimile transmission, i-FAX transmission, copier, and Scan-to-USB. When the current registration is for registering a new user, the administrator enters limitation on the functions permitted to the new user. When the current registration is for modifying an existing user, if necessary, the administrator modifies the limitation on the functions permitted to the existing user. The entered or modified limitation is stored in the functional limitation storage area 14A. The flow proceeds to S230.

In S230, the MFP 1 judges as to whether the second authentication data is to be registered. The administrator can inform the MFP 1 of registration of the second authentication data by manipulating a predetermined key in the operation unit 18. In S230, therefore, the MFP 1 judges based on the manipulated key as to whether the administrator registration of the second authentication data is requested.

In S230, when the MFP 1 determines that registration of the second authentication data is requested (S230: YES), in S235, the MFP 1 receives second authentication data corresponding to the user. When the current registration is for registering a new user, the administrator enters second authentication data corresponding to the new user. When the current registration is for modifying an existing user, if necessary, the administrator modifies the second authentication data corresponding to the existing user. The entered or modified second authentication data is stored in the identifying image data storage area 14B. The flow proceeds to S240.

In S235, specifically, the administrator sets a sheet having an image of an imprinted personal seal, provided by the user being registered, in the scanner unit 12 and instructs the MFP 1 to extract the second authentication data from the scanned sheet. The MFP 1 therefore scans the sheet and extracts pixels containing a color component of a specific type of ink from the read image. Thus, the second authentication data, i.e., image data representing the imprinted personal seal, is generated and stored in the identifying image storage area 14B. Following S235, the flow proceeds to S240. In 230, when the MFP 1 determines that the current registration does not require registration of the second authentication data (S230: NO), the MFP 1 skips S235 and proceeds to S240.

In S240, the MFP 1 judges as to whether the user registration is completed (S240). The administrator can inform the MFP 1 of completion of the user registration by manipulating a predetermined key in the operation unit 18. In S240, therefore, the MFP 1 judges completion of the user registration based on the manipulated key.

In S240, when the MFP 1 determines that the administrator requests for further user registration and the user registration is not completed (S240: NO), the flow returns to S205, and the MFP 1 repeats S205-S240. When the MFP determines that the user registration is completed and the administrator wishes to finish the user registration (S240: YES), the MFP 1 terminates the flow.

Figure 6:
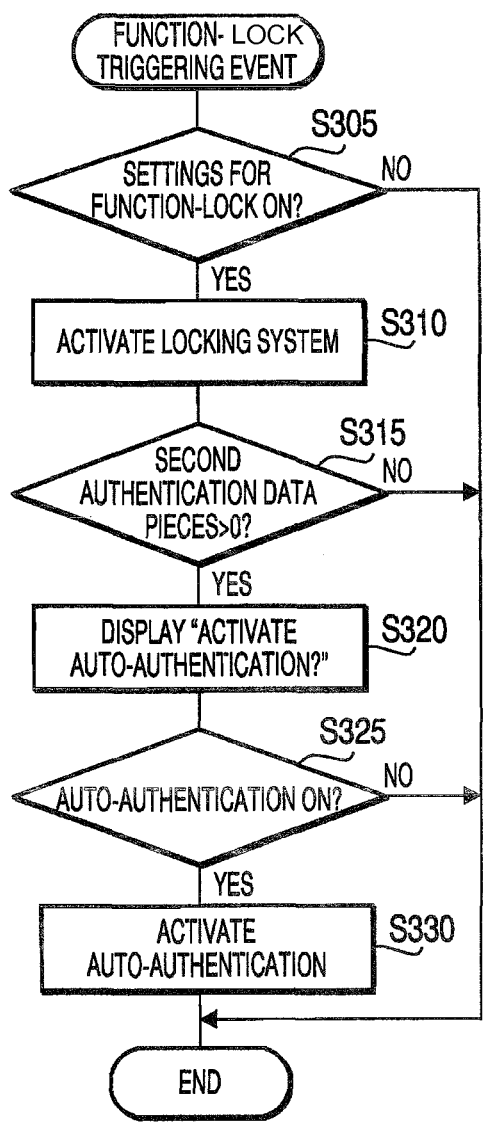
FIG. 6 is a flowchart to illustrate a function-locking flow executed in the MFP according to the embodiment of the present invention.

Next, a flow of function-locking in the MFP 1 will be described with reference to FIG. 6. The flow of function-locking is activated upon a triggering event in S115, which is manipulation of the corresponding key by the administrator of the MFP 1. In the function-locking flow, authentication of users in the second authentication method can be validated so that a locking system to restrict usage of the functions of the MFP 1 according to the functional limitation registered in the functional limitation storage area 14A on basis of the user is activated.

When the flow starts, in S305, the MFP 1 judges as to whether the MFP 1 has necessary information to activate a locking system to lock the functions of the MFP 1. The necessary information to activate a locking system may be, for example, the information registered in the user registration in S205-S240.

Therefore, when at least one user name is registered and when limitation on the functions for the user is registered, the MFP 1 determines that MFP 1 has the necessary information to activate the locking system for the user.

In S305, when the MFP 1 judges that the MFP 1 does not have the necessary information to activate the locking system (S305: NO), the MFP 1 terminates the flow. When the MFP 1 judges that the MFP 1 has the necessary information to activate the locking system (S305: YES), in S310, the MFP 1 activates the locking system. When the locking system is activated, the activation is indicated, for example, by a flag in a predetermined memory area in the MFP 1 to be referred to in the succeeding steps (see S405 in FIG. 7).

In S315, the MFP 1 examines a number of pieces of second authentication data and judges as to whether the number is greater than zero (0). In other words, the MFP 1 judges as to whether at least one piece of second authentication data is registered. When the number of pieces of registered second authentication data is zero (S315: NO), the MFP 1 cannot authenticate users in the second authentication method; therefore, the MFP 1 terminates the flow. In this regard, the MFP 1 will authenticate users solely in the first authentication method.

In S315, when the number of pieces of registered second authentication data is greater than zero (S315: YES), the MFP 1 can authenticate users in the second authentication method. In S320, the MFP 1 presents a message to the administrator through the display unit 19. In the message, the MFP 1 asks the administrator as to whether "auto-authentication," which is authentication according to the second authentication method, is to be activated. The administrator can manipulate the operation unit 18 to enter the instruction concerning activation of auto-authentication.

When the administrator's instruction is entered, in S325, the MFP 1 judges as to whether the auto-authentication is to be activated. When the auto-authentication is not to be activated (S325: NO), the administrator's instruction means that the second authentication method is not to be used. Therefore, the MFP 1 terminates the flow. In this regard, the MFP 1 will authenticate users solely in the first authentication method.

When the auto-authentication is to be activated (S325: YES), the administrator's instruction means that the second authentication method is to be used. Therefore, in S330, the MFP 1 activates the auto-authentication. Thereafter, the MFP 1 terminates the flow. In this regard, the MFP 1 can authenticate users both in the first authentication method and the second authentication method.

Next, a flow of function-controlling will be described with reference to FIGS. 7 and 8. The flow of function-controlling is activated upon a triggering event in S115, which is manipulation of the corresponding key by the administrator and other user of the MFP 1. The triggering event refers to a user's instruction to call a desired function in the MFP 1.

In the flow of function-controlling, the functions of the MFP 1 (e.g., copier function, facsimile transmission, etc.) can be activated. Although detailed behaviors to be controlled may vary depending on the function being activated, the functions of the MFP 1 are activated similarly in the function-controlling flow. Therefore, behaviors specifically relating to the present invention in the function-controlling flow, such as behaviors concerning user authentication and permission to activation of the function, are common among the plurality of functions in the MFP 1. Therefore, the following description will not specifically refer to any of the functions to be activated.

When the flow starts (see FIG. 7), in S405, the MFP 1 obtains information concerning activation of the locking system. In S410, the MFP 1 judges as to whether the locking system is activated. In particular, the MFP 1 inspects presence and absence of the flag stored in the predetermined memory area indicating the activation of the locking system (see S310 in FIG. 7).

In S410, if the MFP 1 judges that the locking system is active (S410: YES), in S415, the MFP 1 identifies the user who has logged in. Further, in S420, the MFP 1 obtains the functional limitation for the user.

In particular, when the user is authenticated according to the first authentication method and has logged in the MFP 1, the name of the user is stored in a predetermined memory area. Therefore, in S415, the MFP 1 refers to the predetermined memory area to obtain the user name therefrom and identifies the current user. When the user fails in authentication, or when a predetermined time period elapses after successful authentication, the MFP 1 operates in the public mode, in which usage of the functions is permitted or restricted in accordance with information registered with the user name "Public." Therefore, when the user has logged in with the user name "Public," the user name "Public" is stored in the predetermined memory area. Thus, the MFP 1 refers to the predetermined memory area and obtains the user name "Public" to recognize that the MFP 1 is operating in the public mode.

In S420, the MFP 1 searches the functional limitation storage area 14A to detect a data set including the identified user name. Thus, the data set corresponding to the current user is obtained. In this regard, when the MFP 1 is operating in the public mode, the data set corresponding to "Public" is obtained.

In S425, the MFP 1 determines usability of the function desired by the current user. In particular, the MFP 1 judges as to whether usage of the desired function is permitted to the current user based on the data set obtained in S420. The desired function is the function called in the triggering event to activate the function-controlling flow. For example, when the user with the user name "User1" (see FIG. 2A) is the current user, and the current user wishes to use the MFP 1 for facsimile transmission, in S425, the MFP 1 judges that the current user is permitted to use the facsimile transmission function. For another example, when the user with the user name "User3" is the current user, and the current user wishes to use the MFP 1 for facsimile transmission, in S425, the MFP 1 judges that the current user is not permitted to use the facsimile transmission function.

Further, in S425, the MFP 1 refers to history of the desired function having been used by the current user. The history indicating the number of times, in which the function has been used by the current user, is recorded in a predetermined area of the storage unit 14. The number is incremented by one each time the same user activates the function. In S425, therefore, the MFP 1 refers to the history and when the MFP 1 finds that the number indicated in the history is equal to or exceeds the permitted number (see FIG. 2A), it indicates that the current user has used the function in the past up to the limited number of times. Therefore, the current user is no longer permitted to use the function. When the MFP 1 finds that the number indicated in the history is within the permitted number, the current user is permitted to use the desired function.

In S425, when the MFP 1 judges that the desired function is permitted to the current user (S425:YES), in S430, the MFP 1 activates the desired function and terminates the function-controlling flow. In S410, when the MFP 1 judges that the locking system is not activated (S410: NO), the MFP 1 also activates the desired function and terminates the function-controlling flow. In S430, the function desired by the user, e.g., printing, scanning, copier, facsimile transmission, i-FAX transmission, Scan-to-USB, is activated. Detailed behaviors of the MFP 1 in S430 utilizing the desired function are equivalent to the behaviors of a conventional MFP; therefore, description of those will be omitted.

In S425, when the MFP 1 judges that the desired function is not permitted to the current user (S425: NO), in S435, the MFP 1 obtains information concerning activation of the auto-authentication (see S330 in FIG. 6). In S440, the MFP 1 judges as to whether the auto-authentication is active based on the obtained information.

In S440, if the MFP 1 judges that the auto-authentication is not active (S440: NO), in S445, the MFP 1 denies the current user activation of the desired function and terminates the function-controlling flow. According to this flow, when the current user is not permitted to use the desired function on basis of the first authentication method (S425: NO), and when the current user is not authenticated in the second authentication method due to inactivation of the auth-authentication (S440: NO), the current user is not provided with further means to cure the restriction. Therefore, the flow is directed to S445, in which usage of the desired function by the current user is denied. In this regard, in S445, the MFP 1 informs the current user of the denial by, for example, a message displayed in the display unit 19.

In S440, if the MFP 1 judges that the auto-authentication is active (S440: YES), in S450, the MFP 1 obtains information concerning availability of auto-authentication based on the function desired by the user, and in S455, the MFP 1 judges as to whether the auto-authentication is available to the desired function.

According to the present embodiment, availability of auto-authentication is preliminarily determined based on as to whether the desired function requires a scanning behavior of the scanner unit 12. For example, when the desired function is facsimile transmission, which involves the scanner unit 12 to read the original sheet, the auto-authentication is available. For another example, when the desired function is printing, which does not involve the scanner unit 12, the auto-authentication is unavailable.

In S455, if the MFP 1 judges that the auto-authentication is unavailable (S455: NO), in S445, the MFP denies activation of the desired function and terminates the function-controlling flow.

In S455, if the MFP 1 judges that the auto-authentication is available (S455: YES), in S460, the MFP 1 sets a character string "INIT," which is an initializing character string, in a flag storage area named "NextUser." The NextUser flag is referred to when the MFP 1 judges a current user. Thereafter, in S465, the MFP 1 controls the scanner unit 12 to start scanning the original sheet. The flow proceeds to S457 (see FIG. 8). The scanner unit 12 reads a predetermined range on a scannable area of the original sheet at a time and repeats scanning after completion of scanning the predetermined range until an entire scannable area of the original sheet is scanned.

In S475, the MFP 1 activates an authentication code analyzing flow and a user information confirmation flow, which are run concurrently in parallel in the MFP 1. The flows will be described respectively with reference to FIGS. 9 and 10 hereinbelow.

The authentication code analyzing flow will be described with reference to FIG. 9. When the flow starts, in S605, the MFP 1 starts obtaining the image data, and in S610, the MFP 1 stores the obtained imaged data. The image data to be obtained in S605 is the image data generated in the scanning operation of the scanner unit 12 in S465. The image data generated in the scanning operation is stored in the image buffer 14C for scanner, and at the same time, obtained in S605. The obtained image data is stored in the buffer area 14D for second authentication data analysis in S610.

In S615, the MFP 1 analyzes the image data stored in the buffer area 14D and extracts the second authentication data. In the present embodiment, the MFP 1 detects and extracts pixels containing color components of specific ink from the read image. Thus, an image of the imprinted personal seal of the current user is obtained.

In S620, the MFP 1 judges as to whether a candidate image for the second authentication data is successfully extracted. If the MFP 1 judges that the candidate image is not extracted (S620: NO), the flow proceeds to S625, in which the MFP 1 judges as to whether the image data for the entire scannable area has been obtained.

In the present embodiment, if judgment in S620 is made immediately after activation of the authentication code analyzing flow, the MFP 1 judges that obtainment of the image data for the entire image has not been completed (S620: NO). Therefore, in S630, the MFP 1 removes redundant image data stored in the buffer area 14D for second authentication data analysis therefrom to discard.

The image data to be discarded in S630 refers to image data obtained from a range, which has been analyzed and is determined that no second authentication data is included therein. Meanwhile, image data obtained from a range, which is not yet analyzed and may or may not include the second authentication data, is maintained in the buffer area 14D for second authentication data analysis.

For example, when the MFP 1 is configured to scan the scannable area of the original sheet for a range having a width of 20 mm with respect to the scanning direction of the scanner unit 12 at a time to obtain the second authentication data, at least a piece of image data corresponding the range is maintained in the buffer area 14D for second authentication data analysis constantly during the flow.

Thus, in S610, each time a new piece of image data is obtained and stored in the buffer area 14D, in S615, the MFP 1 analyzes the image included in the image data having been stored in the buffer area 14D and in the newly obtained piece of image data.

Thereafter, in S620, if no second authentication data is extracted (S620: NO), the latest piece of image data obtained from the predetermined range with the width of 20 mm is maintained in the buffer area 14D, and the other older image data is determined to be redundant and discarded in S630. Therefore, the area having been occupied by the redundant image data is released to a new piece of image data to be stored.

The flow thereafter returns to S610. Thus, the MFP 1 repeats S610-S630 until candidate image data for the second authentication data is extracted or until completion of obtaining the image data for the entire scannable area of the original sheet.

When the candidate image data for the second authentication data is successfully extracted (S620: YES), the flow proceeds to S635, in which the MFP 1 ceases obtaining the image data. Thus, storing the image data in the buffer area 14D for second authentication data analysis is ceased.

In this regard, however, scanning the image on the scannable area of the original sheet to generate the image data and storing the generated image data in the image buffer 14C for scanner are continued.

Following S635, in S640, the MFP 1 refers to the identifying image storage area 14B and compares the image data representing the candidate image, extracted in S615, with the second authentication data registered in the identifying image storage area 14B. In S640, matching of the image data representing candidate image and the registered second authentication data can be examined by a known image matching algorithm for personal seals. For example, one of the extracted and registered images is rotated to be laid over the other of the images, and commonality of the two images can be examined to find as to whether features of the two images coincide.

In S645, if the MFP 1 judges that authentication is successful (S645: YES), in S650, the MFP 1 removes the image data stored in the buffer area 14D for second authentication data analysis therefrom to discard. Thereafter, in S655, the MFP 1 sets the user name of the currently approved user to be the "NextUser" and stores the user name in the flag storage area named "NextUser." The MFP 1 ends the authentication code analyzing flow.

For example, if the image currently having been read coincides with the image of the identifying personal seal registered to be in association with the user name "User1," in S655, "User1" is set to be "NextUser."

In S645, if the MFP 1 judges that authentication is not successful (S645: NO), in S660, the MFP discards the image data stored in the buffer area 14D for second authentication data analysis. Further, in S665, the MFP 1 sets a character string "None," indicating the failure in authentication with the current user, in the flag storage area "NextUser." The MFP 1 ends the authentication code analyzing flow thereafter.

Whilst the steps S610-S630 are repeated, the MFP 1 may judge in S625 that the image data of the entire scannable area of the original sheet has been obtained (S625: YES). This affirmative judgment is made when obtainment of the image data of the entire scannable area has been completed but no candidate image data for the second authentication data has been extracted. In this flow, accordingly, in S660, the MFP 1 discards the image data stored in the buffer area 14D for second authentication data analysis, and in S665, the MFP 1 sets the character string "None" in the flag storage area "NextUser." The MFP 1 ends the authentication code analyzing flow thereafter.

Next, the user information confirmation flow, which is run concurrently in parallel with the above-described authentication code analyzing flow, will be described with reference to FIG. 10. When the user information confirmation flow starts, in S705, the MFP 1 starts obtaining the image data. The image data to be obtained in S705 is the image data generated in the scanning operation of the scanner unit 12 in S465.

Figure 9:
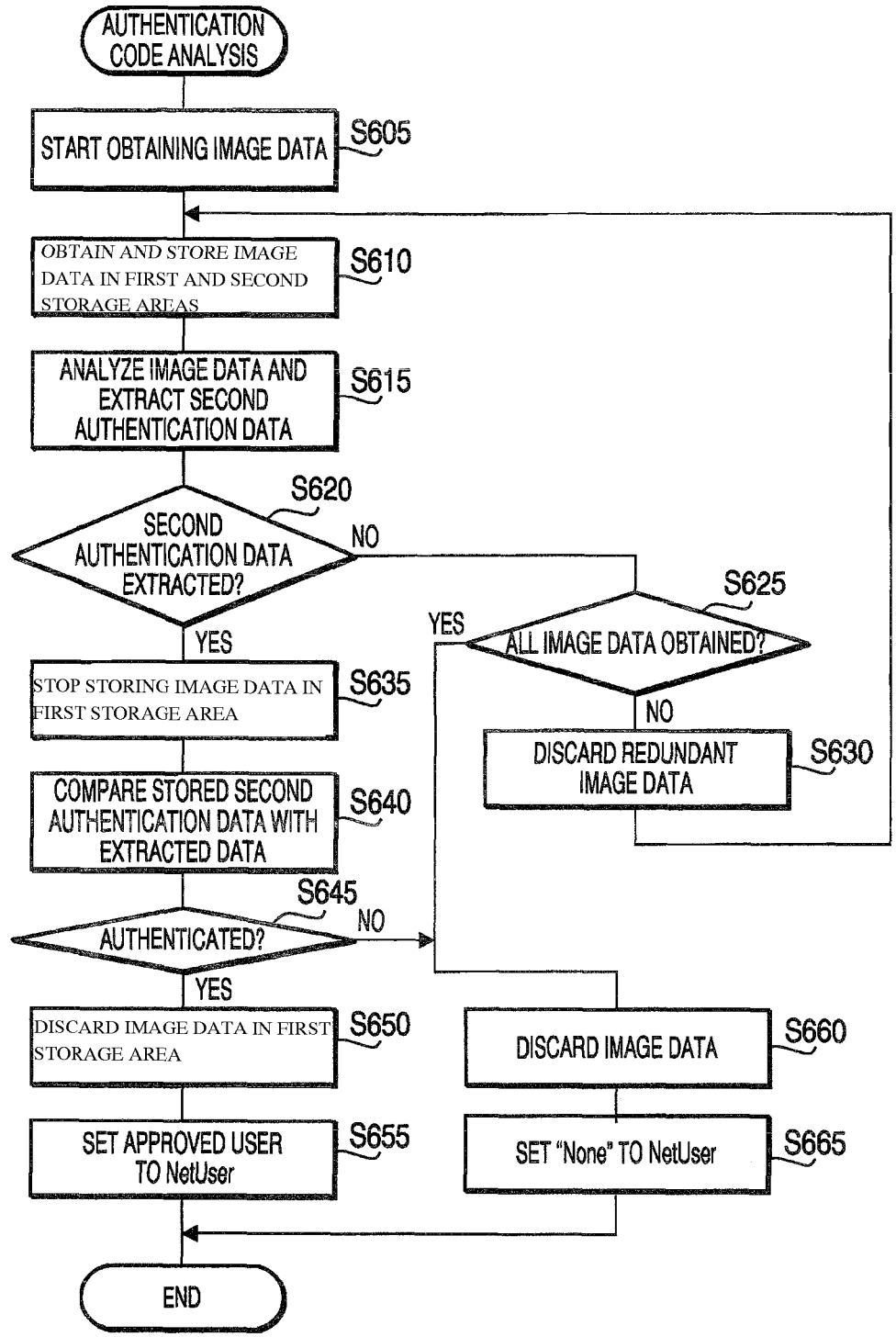
FIG. 9 is a flowchart to illustrate an authentication code analyzing flow executed in the MFP according to the embodiment of the present invention.

Following S705, in S710, the MFP 1 refers to the user name stored in the NextUser flag storage area, and in S715, the MFP 1 judges as to whether the NextUser flag indicates "INIT." According to the present embodiment, information stored in the NextUser flag is initialized in S460 and rewritten with replacing information in the authentication code analyzing flow (FIG. 9). Therefore, the MFP 1 refers to the revised information in the NextUser flag in S710 to judge as to whether the NextUser flag indicates "INIT."

in S715, if the MFP 1 judges that the NextUser flag indicates "INIT" (S715: YES), it is determined that the MFP 1 has not experienced S655 or S664. Therefore, the authentication code analyzing flow has not been completed. In S720, the MFP 1 judges as to whether obtainment of the image data of the entire scannable area of the original sheet has been completed.

If obtainment of the image data of the entire scannable area of the original sheet has not been completed (e.g., immediately after starting to obtain the image data) (S720: NO), in S725, the MFP 1 obtains and stores the image data in the image buffer 14C for scanner.

In S730, the MFP 1 processes the image data by use of the function desired by the user. Processing operations to process the image data may vary depending on the function desired by the user. For example, when the user desires to use the copier function of the MFP 1 to make a duplicate of the image having been scanned, the image data is modified into a desired format which is operable in the printer unit 13. For another example, when the user desires to use the facsimile transmission function, the image data is modified into a desired format which is transmittable through the PSTN communication unit 16.

Following S730, the flow returns to S710. Thereafter, the steps S710-S730 are repeated until the MFP 1 judges that the NextUser indicates "INIT" (S715: NO) or the image data for the entire scannable area of the original sheet has been obtained (S720: YES).

When obtainment of the image data of the entire scannable area has been completed (S720: YES) during the repeated steps S710-S730, the flow skips S720 and repeats to S710. Accordingly, the flow repeats the stepsS710-S720 thereafter.

Whilst the steps S710-S720 are repeated, in the authorization code analyzing flow (FIG. 9), which is run concurrently with the user information confirmation flow, the MFP 1 makes an affirmative judgment in S625 (S625: YES). Thereafter, in S665, the character string "None" is set in the NextUser flag. Alternatively, the flow proceeds to S655 via affirmative judgments in S620 (S620: YES) and S645 (S645: YES), and the user name of the approved user is set in the NextUser flag in S655.

According to the above flow, the information in the NextUser flag is replaced with either "None" or the approved user. Therefore, in the user information confirmation flow, meanwhile, the MFP 1 judges that the NextUser flag does not indicate "INIT" in S715 (S715: NO). Thereafter, the MFP 1 ends the user information confirmation flow. Accordingly, the authorization code analyzing flow (FIG. 9) and the user information confirmation flow (FIG. 10) end substantially simultaneously. The step S475 (FIG. 8) in the function controlling flow is completed, and the flow proceeds to S480.

In S480, the MFP 1 refers to the NextUser flag, and the information in the NextUser flag storage area is read. Thereafter, in S485, the MFP 1 judges as to whether the NextUser flag indicates the approved user (e.g., one of the registered users "User1"-"User3" illustrated in FIG. 2A).

In S485, if the MFP 1 judges that the NextUser flag indicates the approved user (S485: YES), in S490, the MFP 1 refers to the functional limitation storage area 14A and reads the functional limitation associated with the approved user. In S495, the MFP 1 examines usability of the function desired by the currently approved user. For example, when the user with the user name "User1" (see FIG. 2A) is the currently approved user, and the user wishes to use the MFP 1 for the copier function, in S495, the MFP 1 judges that the current user is permitted to use the copier function. Thereafter, in S500, the MFP 1 judges as to whether usage of the desired function is permitted to the currently approved user.

In S500, if the MFP 1 determines that usage of the desired function is permitted to the currently approved user (S500: YES), in S505, the MFP 1 judges as to whether the image data for the entire scannable area of the original sheet has been obtained. In S505, affirmative judgment is made when: the current user is authenticated in S645 (see FIG. 9) (S645: YES); the authentication code analyzing flow (see FIG. 9) is completed; the user information confirmation flow (see FIG. 10) is terminated after negative judgment in S715 (S715: NO); and obtainment of the image data for the entire scannable area of the original sheet is incomplete. If affirmative judgment is made in S505 (S505: YES), in S510, the MFP 1 obtains and stores the image data in the image buffer 14C for scanner. Accordingly, the image data for the entire scannable area of the original sheet is completed. The flow proceeds to S515.

Figure 10:
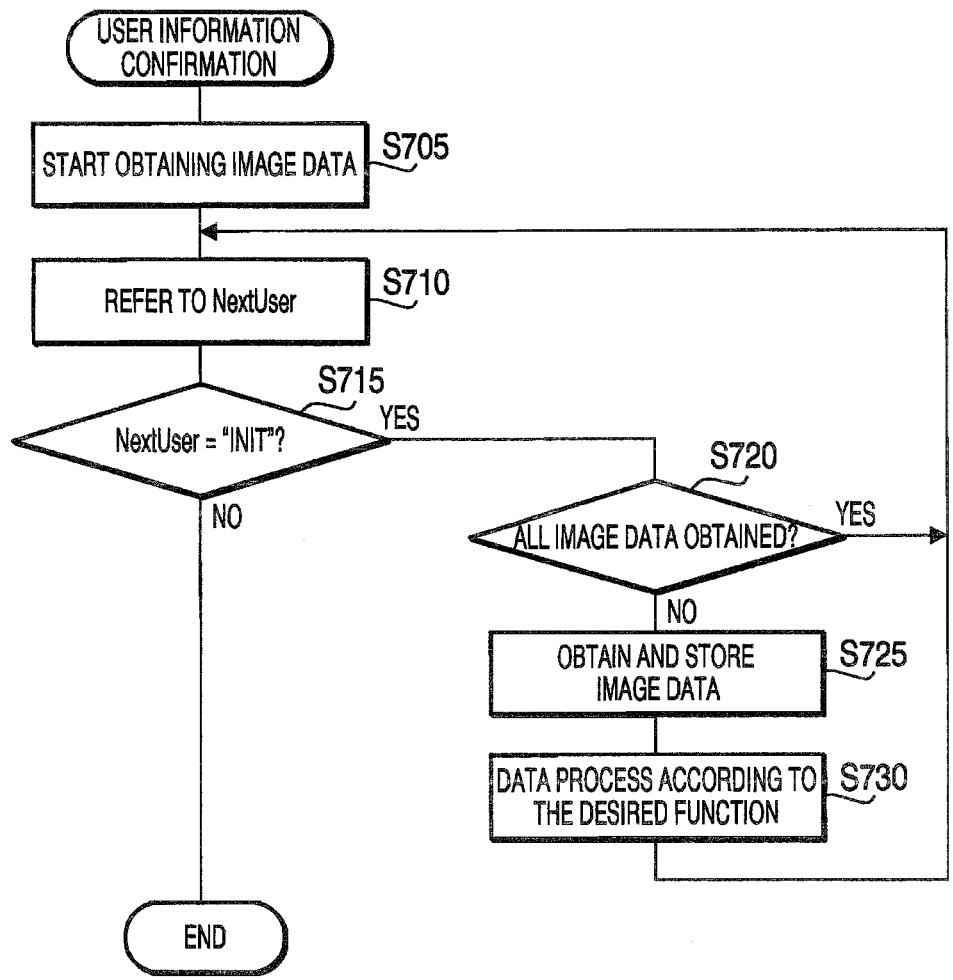
FIG. 10 is a flowchart to illustrate a user information confirmation flow executed in the MFP according to the embodiment of the present invention.

In S505, meanwhile, negative judgment is made if affirmative judgment has been made in S720 (see FIG. 10). In this regard, obtainment of the image data for the entire scannable area of the original sheet has been completed; therefore, the flow skips S510 and proceeds to S515.

In S515, the MFP 1 switches users. For example, if the current user has logged in with the user name "User1," but the identifying image extracted and approved in S640 coincides with an image represented by the second authorization data of "User3," the MFP 1 considers the current user to be "User3" and switches the user names from "User1" to "User3."

Figure 7:
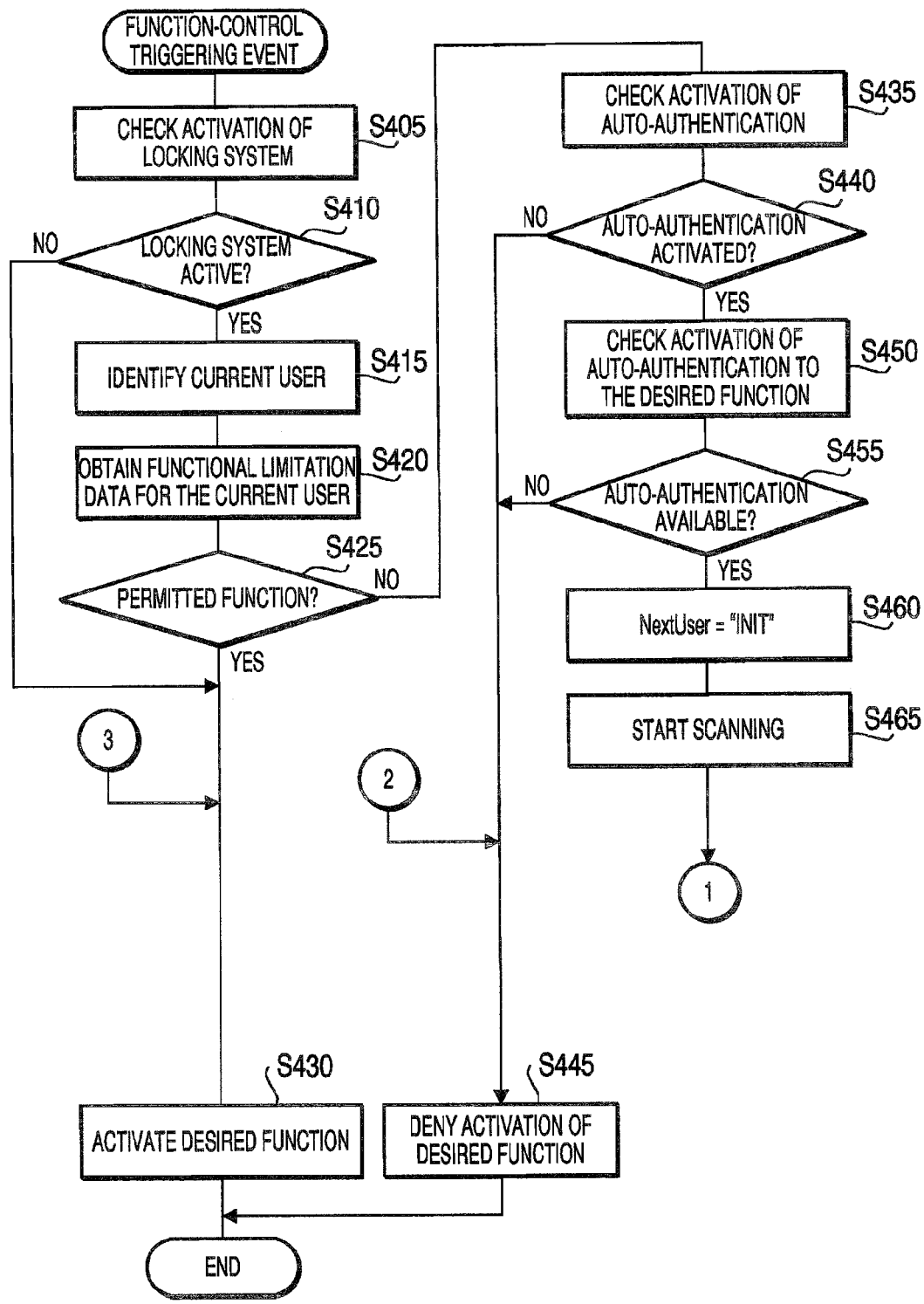
FIG. 7 is a flowchart to illustrate a function controlling flow executed in the MFP according to the embodiment of the present invention.
Figure 8:
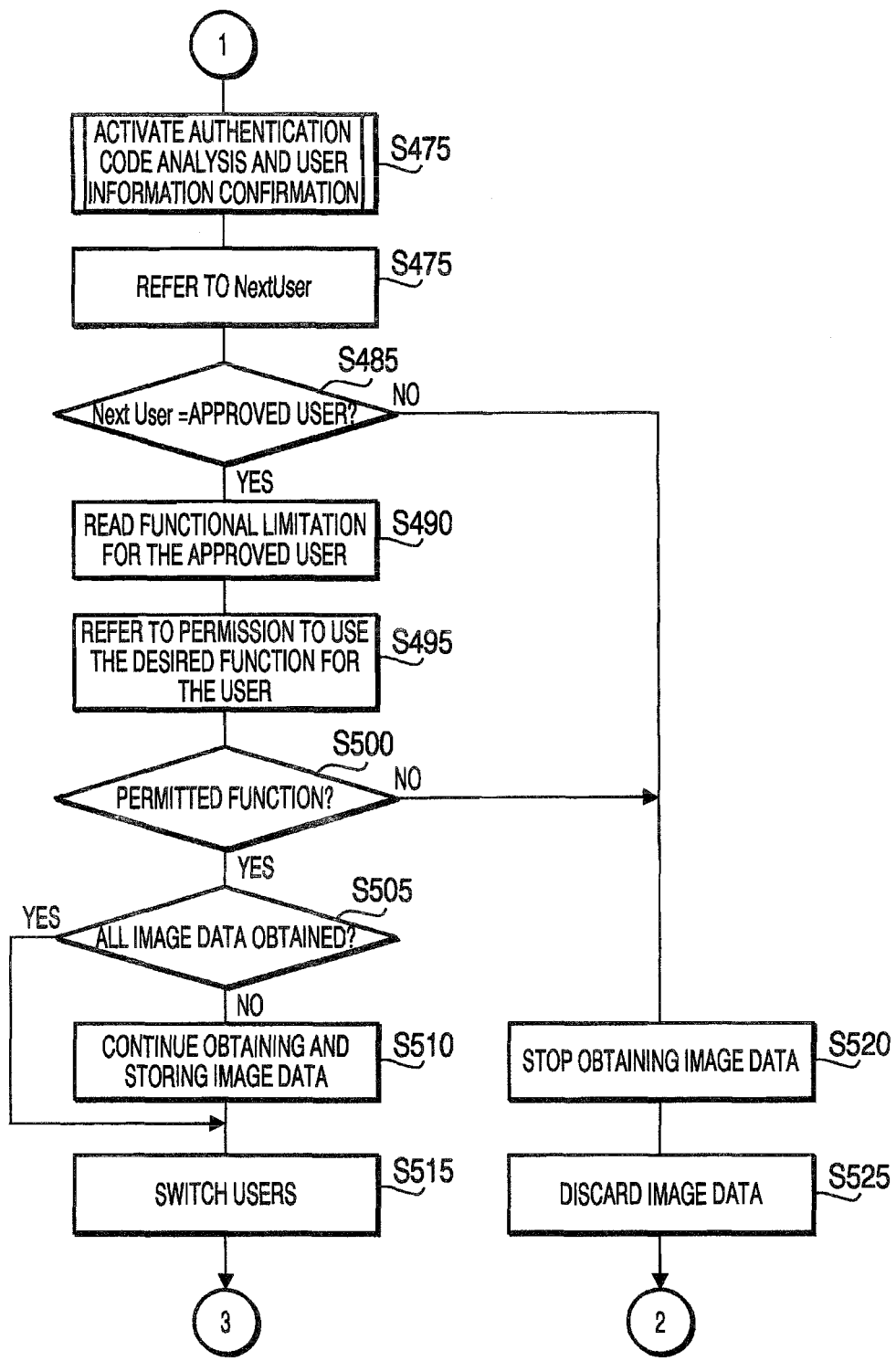
FIG. 8 is a flowchart to illustrate the function controlling flow executed in the MFP according to the embodiment of the present invention.

The flow proceeds to S430 (see FIG. 7). In S430, the MFP 430 activates the function desired by the user and ends the function controlling flow thereafter.

In S485, when the MFP 1 judges that the NextUser flag does not indicate the approved user (S485: NO), alternatively, when usage of the desired function is not permitted to the currently approved user (S500: NO), in S520, the MFP 1 ceases obtainment of the image data. When negative judgment is made in S485 or in S500, the MFP 1 is restricted from activating the desired function, and continuous obtainment of the image data would be redundant. Therefore, obtainment of the image data is ceased in S520.

In S525, the MFP 1 discards the image data stored in the image buffer 14C for scanner. The flow proceeds to S445 (see FIG. 7), in which the MFP 1 denies the current user activation of the desired function and terminates the function-controlling flow.

According to the above flows, the MFP in the present embodiment activates in S430 a desired function, in which a processible image can be processed, when an identifying image qualifying predetermined authorization criteria is included in the processible image (S495: YES). Therefore, only limited users who can form the identifying images in the processible image are allowed to activate such a function. Further, a number of times to use the function can be controlled on the basis of an approved user so that even the approved user can be allowed to use the function within the limited number, which is assigned by the administrator.

According to the above embodiment, therefore, the user is released from necessity to manually input the user name and the password to login the MFP 1, unlike the conventional devices which can be logged in solely in the first authentication method.

In the MFP 1 according to the above embodiment, the identifying image is formed in the processible image; therefore, it is not necessary to have the identifying image and the processible image scanned by the scanner unit independently, but the identifying image and the processible image can be scanned in one scanning operation.

In the MFP 1 according to the above embodiment, the authentication code analyzing flow illustrated in FIG. 9 and the user information confirmation flow illustrated in FIG. 10 are run concurrently in parallel. Therefore, authentication of the user can be completed in a shorter period compared to a configuration in which the authentication code analyzing flow is run serially after completion of the processible image.

According to the above MFP 1, pieces of image data having been obtained and stored in the buffer area 14D for second authentication data analysis, which is determined in S615-S620 to be redundant not containing image data for the identifying image, are removed therefrom in S630. Therefore, the storage area occupied by the discarded image data is released to a new piece of image data to be stored in S610, and the buffer area 14D for second authentication data analysis can be used effectively.

Further, the MFP 1 in the above embodiment is equipped with the functional limitation storage area 14A (see FIG. 2A), in which permission and restriction of the respective functions can be set personally on basis of the user. Therefore, when usability of the predetermined function is set in the functional limitation storage area 14A, in S490-S500, usability of the function can be judged based on the information stored in the functional limitation storage area 14A.

Furthermore, when it is determined that usage of the function is not permitted to the user in S500, and obtainment for the image data of the processible image is not completed at the timing of judgment, in S520, obtainment for the image data of the processible image is ceased. Therefore, redundant obtainment for the image data, which would be an operation in vain, can be prevented from being continued.

Although an example of carrying out the invention has been described, those skilled in the art will appreciate that there are numerous variations and permutations of the image processing device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiment, the obverse side D1 and the reverse side D2 of the original sheet can be scanned by the image sensors 12A and 12B respectively. However, the present invention can be similarly applied an MFP capable of scanning a single side only. Alternatively, the present invention can be similarly applied to an MFP having a single image sensor, which can scan both sides of the original sheet when the MFP is equipped with a sheet feeding path and a mechanism to reverse sides of the original sheet.

For another example, the identifying image may be read and extracted from either one of the obverse side D1 and the reverse side D2. When a side from which the identifying image is read is fixed to a predetermined one of the two sides, solely the predetermined side can be scanned to be analyzed in order to detect the identifying image therein. The other side of the original sheet can be simply scanned to obtain the processible image and processed by the scanner unit 12 which behaves as a conventional scanner. When a side from which the identifying image is read is not fixed to one side, both sides can be scanned to be analyzed in order to detect the identifying image therein.

For another example, the identifying image may not necessarily be an imprinted personal seal, but may be, for example, a hand-written or printed character string, a fingerprint, a bar-code, and a two-dimensional code, which can be optically read by an image sensor. When a hand-written image is used as the identifying image, a technique to analyze hand-written images by, for example, extracting hand-written features from the image to identify the user needs to be installed in the MFP. When a fingerprint is used as the identifying image, a technique to identify the user based on the fingerprint needs to be installed. When a bar-code or a two-dimensional code is used as the identifying image, similarly, a technique to analyze the code needs to be installed.

What is claimed is:

1. An image processing device configured to provide a plurality of functions including a limited function, the limited function being usable to a permitted user in a limited operation mode, the image processing device comprising:
    a scanner configured to scan an image including an identifying image of a user who is registered in association with the image processing device and a processible image on a single sheet in a scanning direction, the identifying image being formed in an arbitrary area with the single sheet;
    a memory device comprising a first area and a second area;
    a control device configured to scan the image on the single sheet portion by portion from upstream to downstream sequentially along the scanning direction,
    wherein the scanning by the control device comprises:
    scanning an upstream portion of the single sheet, the upstream portion being an upstream part of the single sheet with regard to the scanning direction and being defined in a predetermined range in the scanning direction,
    obtaining image data from the scanned first portion of the single sheet;
    storing the obtained image data in both the first area and the second area in the memory device; and
    determining whether the obtained image data stored in the first area includes the identifying image of the user associated with the limited function of the image processing device, the limited function being configured to process the obtained first image data and being allowed to be activated by the permitted user;
    wherein the scanning by the control device is activated while the image processing device is in the limited operation mode and when the limited function requested by the permitted user involves a scanning behavior using the scanner;
    wherein, when it is determined that the obtained image data stored in the first area does not include the identifying image of the user, the control device performs the scanning further with a downstream portion of the single sheet, the downstream portion being a downstream part of the single sheet with regard to the scanning direction and being defined in the predetermined range in the scanning direction, until the control device determines that the obtained image data stored in the first area includes the identifying image of the user associated with the limited function of the image processing device;
    wherein, when it is determined that the obtained image data stored in the first area includes the identifying image of the user associated with the limited function of the image processing device, the scanning by the control device further comprises:
    scanning a remaining portion of the single sheet downstream from the scanned portion;
    obtaining processible image data from the scanned remaining portion of the single sheet;
    storing the obtained processible image data in the second area and stop storing the obtained processible image data in the first area; and
    implementing the limited function of the image processing device based on the image data and the processible image data stored in the second area;
    wherein, when it is determined that the obtained image data stored in the first area does not include the identifying image of the user associated with the limited function of the image processing device, and if there is no further downstream portion to scan on the single sheet, the scanning is terminated and the control device informs the user of the termination of the scanning; and
    wherein, when it is determined that the obtained image data stored in the first area includes the identifying image of the user but the identifying image is not associated with the limited function of the image processing device, the scanning is terminated and the control device informs the user of the termination of the scanning.

2. The image processing device according to claim 1, wherein the control device removes the obtained image data from the first area of the memory device when it is determined that the obtained image data lacks the identifying image.

3. The image processing device according to claim 1, wherein a width of each predetermined range with respect to the scanning direction corresponds to a width which contains a widthwise dimension of the identifying image.

4. The image processing device according to claim 1, wherein the identifying image is formed in the arbitrary area which is arbitrarily designated by an administrator.

5. The image processing device according to claim 1, wherein the identifying image is formed in the arbitrary area which is arbitrary to the user.

6. The image processing device according to claim 1, wherein the scanner is configured to scan the image including at least the processible image on an additional sheet continuously from the single sheet.

7. The image processing device according to claim 1, wherein, when the image processing device is in the limited function mode, the control device authenticates the user by a first method, in which the user is required to enter a user-specific password, and a second method, in which the scanning by the control device is activated.

8. A computer readable storage device storing computer readable instructions that cause a computer to process an image including an identifying image of a user who is registered in association with the computer and a processible image formed on a single sheet by scanning the image on the single sheet portion by portion from upstream to downstream sequentially along a scanning direction, the scanning comprises the steps of:
    scanning an upstream portion of the single sheet, the first portion being an upstream part of the single sheet with regard to the scanning direction and being defined in the predetermined range in a scanning direction, the identifying image being formed in an arbitrary area with the single sheet;

obtaining image data from the scanned portion of the single sheet;

storing the obtained image data in a first area and a second area of a memory device;

determining whether the obtained image data stored in the first area includes the identifying image of the user associated with a limited function of the computer, the limited function being usable to a permitted user in a limited operation mode and being configured to process the obtained image data and being allowed to be activated by the permitted user;

wherein the scanning is activated while the computer is in the limited operation mode and when the limited function requested by the permitted user involves a scanning behavior using the scanner;

wherein, when it is determined that the obtained image data stored in the first area of the memory device does not include the identifying image of the user, the computer performs the scanning further with a downstream portion of the single sheet, the downstream portion being a downstream part of the single sheet with regard to the scanning direction and being defined in the predetermined range in the scanning direction, until the computer determines that the obtained image data stored in the first area includes the identifying image of the user associated with the limited function of the computer;

wherein, when it is determined that the obtained image data stored in the first area includes the identifying image of the user associated with the limited function of the computer, the scanning further comprises:

scanning a remaining portion of the single sheet downstream from the scanned portion;

obtaining processible image data from the scanned remaining portion of the single sheet;

storing the obtained processible image data in the second area of the memory device and stop storing the obtained processible image data in the first area of the memory device; and implementing the limited function of the computer based on the image data and the processible image data stored in the second area;

wherein, when it is determined that the obtained image data stored in the first area of the memory device does not include the identifying image of the user associated with the limited function of the image processing device, and if there is no further downstream portion to scan on the single sheet, the scanning is terminated and the computer informs the user of the termination of the scanning; and wherein, when it is determined that the obtained image data stored in the first area of the memory device includes the identifying image of the user but the identifying image is not associated with the limited function of the computer, the scanning is terminated and the control device informs the user of the termination of the scanning.

9. The computer readable storage device according to claim 8, wherein a width of each predetermined range with respect to the scanning direction corresponds to a width which contains a widthwise dimension of the identifying image.

10. The computer readable storage device according to claim 8, wherein, when the computer is in the limited function mode, the user is approved by a first method, in which the user is required to enter a user-specific password, and a second method, in which the scanning by the computer is activated.

* * * * *